United States Patent [19]
An

[11] Patent Number: 5,535,597
[45] Date of Patent: Jul. 16, 1996

[54] REFRIGERATOR AND METHOD FOR CONTROLLING THE SAME

[75] Inventor: Sang-Man An, Suwon, Rep. of Korea

[73] Assignee: Samsung Electronics Co., Ltd., Suwon, Rep. of Korea

[21] Appl. No.: 289,273

[22] Filed: Aug. 11, 1994

[30] Foreign Application Priority Data

Aug. 11, 1993 [KR] Rep. of Korea ............... 1993-15566

[51] Int. Cl.$^6$ .................................................. F25B 49/02
[52] U.S. Cl. ................... 62/126; 62/157; 62/229
[58] Field of Search ................ 62/126, 129, 229, 62/155, 157, 158, 231, 180, 127, 161, 163, 164

[56] References Cited

U.S. PATENT DOCUMENTS

| | | | |
|---|---|---|---|
| 4,821,528 | 4/1989 | Tershak | 62/229 X |
| 4,856,287 | 8/1989 | Oike | 62/126 |
| 5,398,251 | 3/1995 | Shim | 62/127 X |

FOREIGN PATENT DOCUMENTS 64-19281  1/1989  Japan.

*Primary Examiner*—Harry B. Tanner
*Attorney, Agent, or Firm*—Burns, Doane, Swecker & Mathis

[57] ABSTRACT

When a malfunctioning condition of an internal temperature detecting unit of a refrigerator is detected, the compressor and fan of the refrigerator are periodically driven to prevent stored food from going bad, and the malfunctioning condition is indicated by visual and audio indicators.

10 Claims, 3 Drawing Sheets

REFRIGERATOR AND METHOD FOR CONTROLLING THE SAME

BACKGROUND OF THE INVENTION

1. Field of the Invention

The present invention relates to a refrigerator and a method for controlling the same, and more particularly to a refrigerator which prevents food from going bad when the internal temperature detecting unit malfunctions.

2. Description of the Prior Art

An example of conventional refrigerators is disclosed in Japanese Patent Laid-open Publication No. Sho 64-19281. The refrigerator control mechanism disclosed in the publication is illustrated in FIG. 3. As shown in FIG. 3, the refrigerator includes a compressor 32 for compressing a refrigerant to a high pressure, a cooling fan 103 for cooling the compressor 32, and a control unit 102 for controlling the cooling fan 103 so as to delay driving of the cooling fan 103 during driving of the compressor 32. The control unit 102 includes an internal temperature sensor 109 for detecting an internal temperature of the refrigerator, a compressor temperature sensor 107 for detecting a temperature of the compressor 32, and an external temperature sensor 105 for detecting an external temperature of the refrigerator.

In the conventional refrigerator having the abovementioned arrangement, a drive signal from the control unit 102 is sent to a compressor driving relay 111 when the internal temperature of the refrigerator detected by the internal temperature sensor 109 is higher than a predetermined temperature. By the drive signal, the compressor driving relay 111 is switched to its closed state, thereby causing the compressor 32 to receive an AC voltage from a power source 113. As a result, the compressor 32 is driven. Thereafter, a determination is made about whether the drive time of the compressor 32 is longer than a predetermined time. When the drive time of the compressor 32 is determined to be longer than the predetermined time, the control unit 10 sends a drive signal to a fan driving relay 115. By the drive signal, the fan driving relay 115 is switched to its closed state, thereby causing the fan 103 to receive the AC voltage from the power source 113. As a result, the fan 103 is driven to cool the compressor 32.

Where an error is generated in the internal temperature sensor 109, which prevents the compressor from being driven when it should, the control unit 102 will eventually detect the generated error to stop the compressor 32 if the user fails to detect it. However, the internal temperature of the refrigerator will have increased over the lapse of time, thereby causing foods contained in the refrigerator to go bad.

SUMMARY OF THE INVENTION

Therefore, an object of the invention is to solve the above-mentioned problem encountered in the prior art and, thus, to provide a refrigerator capable of preventing food contained therein from going bad and a method for controlling the same.

In accordance with one aspect, the present invention provides a refrigerator comprising: control means; temperature detecting means for detecting an internal temperature of a refrigerating space defined in the refrigerator and sending a temperature signal indicative of the detected internal temperature to the control means; compressor driving means for receiving a drive signal generated from the control means and periodically driving a compressor to cool the refrigerating space at an abnormal state of the temperature detecting means; fan motor driving means for receiving another drive signal generated from the control means and periodically driving a fan motor to circulate an air in the refrigerating space at the abnormal state of the temperature detecting means; and abnormal state alarming means for receiving an alarm signal generated from the control means at the abnormal state of the temperature detecting means and informing a user of the abnormal state of the temperature detecting means.

In accordance with another aspect, the present invention provides a method for controlling a refrigerator, comprising the steps of: determining whether an abnormal state occurs in temperature detecting means equipped in the refrigerator and adapted to detect an internal temperature of a refrigerating space defined in the refrigerator; and informing, when the temperature detecting means has been determined to be at the abnormal state, a user of the abnormal state of the temperature detecting means by abnormal state alarming means and periodically driving a compressor and a fan motor both equipped in the refrigerator to prevent foods contained in the refrigerating space from going bad, while driving, when the temperature detecting means has not been determined to be at the abnormal state, the compressor and the fan motor in accordance with the internal temperature detected by the temperature detecting means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
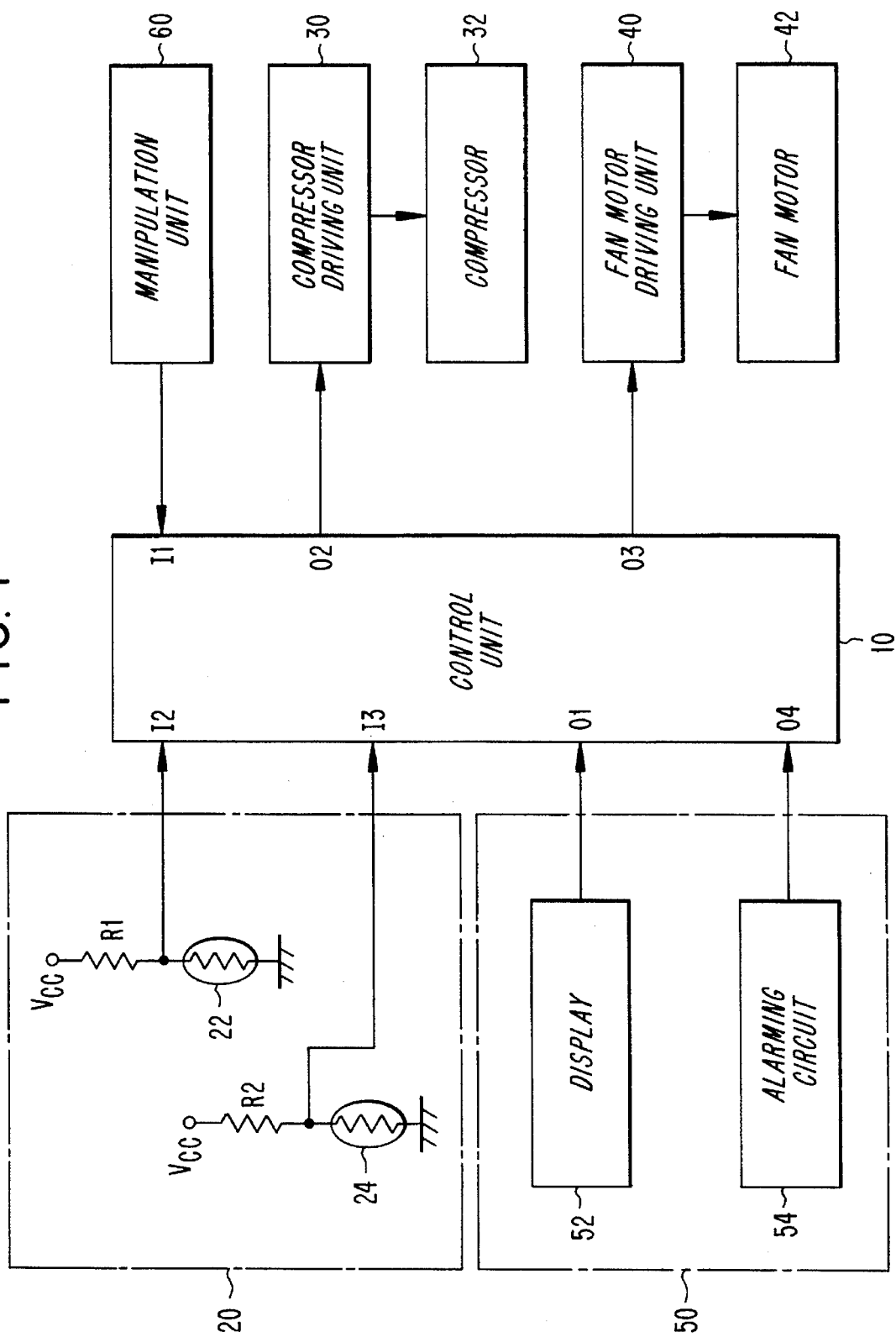
FIG. 1 is a block diagram illustrating a control circuit for a refrigerator in accordance with the present invention.

FIG. 1 is a block diagram illustrating a control circuit for a refrigerator in accordance with the present invention. As shown in FIG. 1, the control circuit includes a control unit 10 which is a microcomputer for controlling operations of a compressor and a fan motor, as will be described hereinafter.

The control circuit further includes a temperature detecting unit 20 for detecting an internal temperature of a refrigerating space defined in the refrigerator and sending a signal indicative of the detected internal temperature to the control unit 10. The temperature detecting unit 20 includes a first temperature sensor 22 adapted to detect a temperature of a refrigerating chamber of the refrigerator and send a signal indicative of the detected temperature to the control unit 10, and a second temperature sensor 24 adapted to detect a temperature of a freezing chamber of the refrigerator and send a signal indicative of the detected temperature to the control unit 10.

In accordance with an embodiment of the present invention, the refrigerating chamber and the freezing chamber constitute the refrigerating space.

The first and second temperature sensors 22 and 24 are thermistors varying in resistance depending on respective temperatures of the refrigerating chamber and the freezing chamber and sending a voltage, corresponding to the sensed temperature, to the control unit. That is, each temperature sensor sends one of 276 equally-divided voltages defined between 0 V and 5 V to input ports I2 and I3 of the control unit 10. A resistor R1 for voltage drop is connected between the first temperature sensor 22 and a voltage source Vcc outputting a DC voltage of 5 V. Between the second temperature sensor 24 and the voltage source Vcc, another resistor for voltage drop is connected.

The control circuit further includes a compressor driving unit 30 for receiving the compressor driving signal from the control unit 10 and periodically driving the compressor 32 in accordance with the drive signal so as to cool the refrigerating space at the abnormal state of the temperature detecting unit 20. The compressor driving unit 30 is connected to an output port O2 of the control unit 10.

A fan motor driving unit 40 is also provided which serves to receive the fan motor driving signal from the control unit 10 and periodically drive the fan motor 42 so as to circulate air in the refrigerating space during an abnormal (malfunctioning) state of the temperature detecting unit 20. The fan motor driving unit 40 is connected to an output port O3 of the control unit 10.

The control circuit further includes an abnormal state alarming unit 50 for receiving an alarm signal from the control unit 10 and informing the user of the abnormal state of the temperature detecting unit 20. The abnormal state alarming unit 50 includes a display 52 adapted to receive the alarm signal from the control unit 10 and display the abnormal state of the temperature detecting unit 20 in accordance with the received alarm signal, and an alarming circuit 54 adapted to generate an audio alarm when the temperature detecting unit 20 is abnormally operated.

A manipulation unit 60 is also connected to an input port I1 of the control unit 10. The manipulation unit 60 is used to set the predetermined temperatures for the refrigerating and freezing chambers and generate an operation stopping command at the abnormal state of the temperature detecting unit 20. The set predetermined temperatures and the generated operation stopping command are input at the input port I1 of the control unit 10.

Figure 2:
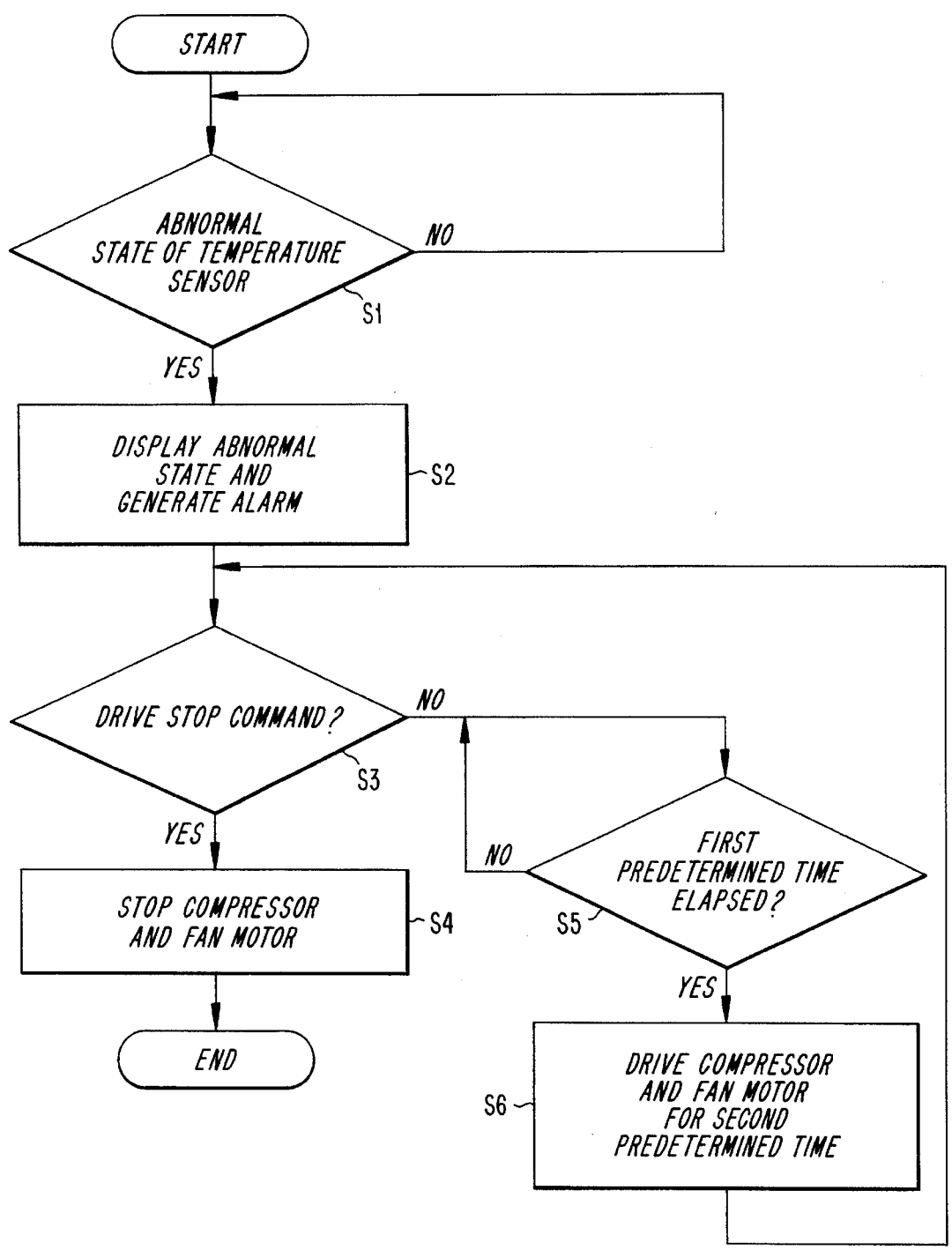
FIG. 2 is a flow chart illustrating a method for controlling the refrigerator in accordance with the present invention.
Figure 3:
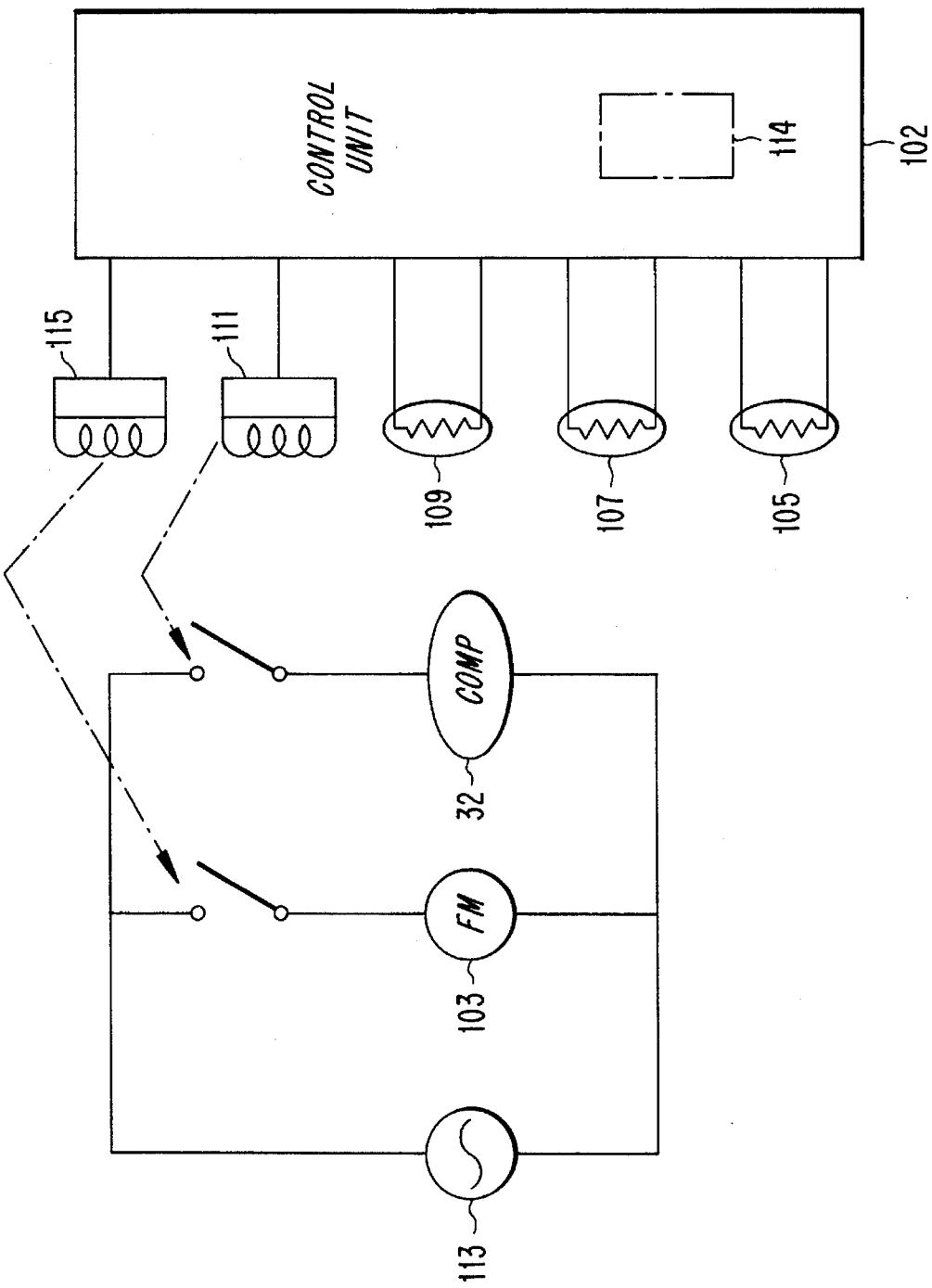
FIG. 3 is a circuit diagram of a control circuit employed in a conventional refrigerator.

FIG. 2 is a flow chart illustrating a method for controlling the refrigerator in accordance with the present invention. Now, this method will be described in conjunction with the control device of FIG. 1. In FIG. 2, the reference character S denotes each step of the control method in accordance with the present invention.

In accordance with the control method of the present invention, when the user plugs in the refrigerator power cord, an AC voltage of 220 V from an AC power source is supplied to the voltage source of the refrigerator at a step S1. Accordingly, a DC voltage of 5 V from the voltage source is supplied to the control unit 10, the manipulation unit 60, the first temperature sensor 22, the second temperature sensor 24, the display 52 and the alarming circuit 54. The voltage source also supplies an AC voltage of 220 V to the compressor driving unit 30 and the fan motor driving unit 40.

Thereafter, the user sets predetermined temperatures for the refrigerating and freezing chambers by manipulating the manipulation unit 60 and then switches on an operation start switch mounted on the manipulation unit 60. As the operation start switch is switched on, a drive signal from an output port O1 of the control unit 10 is sent to the compressor driving unit 30. Simultaneously, another drive signal from the output port O3 of the control unit 10 is sent to the fan motor driving unit 40. As a result, the compressor driving unit 30 applies the voltage of AC 220 V to the compressor 32, thereby causing the compressor 32 to be driven. Also, the fan motor driving unit 40 applies the voltage of AC 220 V to the fan motor 42, thereby causing the fan motor 42 to be driven to rotate the fan. As the fan rotates, air circulates in the refrigerating and freezing chambers. As a result, internal temperatures of the refrigerating and freezing chambers is lowered.

The internal temperature of the refrigerating chamber is detected by the first temperature sensor 22 which, in turn, sends a temperature signal indicative of the detected internal temperature of the refrigerating chamber to the input port I2 of the control unit 10. In similar fashion, the internal temperature of the freezing chamber is detected by the second temperature sensor 24 which, in turn, sends a temperature signal indicative of the detected internal temperature of the freezing chamber to the input port I3 of the control unit 10.

Upon receiving the temperature signals, the control unit 10 determines whether the internal temperatures of the refrigerating and freezing chambers are higher than the corresponding predetermined temperatures, respectively. When both the internal temperatures of the refrigerating and freezing chambers are determined to be higher than respective predetermined temperatures, the drive signal from the output port O2 of the control unit 10 is continuously sent to the compressor driving unit 30. As a result, the compressor 32 is continuously driven. In this case, the drive signal from the output port O3 of the control unit 10 is also continuously sent to the fan motor driving unit 40, thereby causing the fan to rotate continuously.

On the other hand, where neither of the internal temperatures of the refrigerating and freezing chambers is not determined to be higher than its determined temperature, a drive stop signal from the output port O2 of the control unit 10 is sent to the compressor driving unit 30. Simultaneously, another drive stop signal from the output port O3 of the control unit 10 is sent to the fan motor driving unit 40. As a result, no voltage is applied from the compressor driving unit 30 to the compressor 32, thereby causing the compressor 32 to stop. Also, no voltage is applied from the fan motor driving unit 40 to the fan motor 42, thereby causing the fan motor 42 and the fan to stop.

Where an abnormal state of the first temperature sensor 22 is generated, for example, due to an opened state of a power line of the first temperature sensor 22 during the normal temperature control as mentioned above, a voltage of 5 V from the first temperature sensor 22 is sent to the input port I2 of the control unit 10. Upon receiving the voltage of 5 V, the control unit 10 determines that the first temperature sensor 22 is operating abnormally. In this case, the control procedure of the control unit 10 proceeds to a step S2.

At the step S2, an alarm signal from the output port O1 of the control unit 10 is sent to the display 52. The control unit 10 also sends the alarm signal to the alarming circuit 54 via its output port O4. Due to the alarm signal, the display displays the abnormal state of the first temperature sensor 22 so that the first temperature sensor 22 can be checked out. On the other hand, the alarming circuit 54 generates an audio alarm informing the user of the abnormal state of the first temperature sensor 22 so that of the first temperature sensor 22 can be checked out.

Thereafter, the control unit 10 determines whether a drive stop command from the manipulation unit 60 is received at the input port I1 of the control unit 10, at a step S3. When the drive stop command from the manipulation unit 60 is determined to be received at the input port I1 of the control unit 10 (namely, if YES), based on the result of the determination, the control procedure of the control unit 10 proceeds to a step S4.

At the step S4, a drive stop signal from the output port O2 of the control unit 10 is sent to the compressor driving unit 30. Simultaneously, another drive stop signal from the output port O3 of the control unit 10 is sent to the fan motor driving unit 40. By the former drive stop signal, the compressor driving unit 40 applies the voltage to compressor 32 no longer, thereby causing the compressor 32 to stop. On the other hand, no voltage is applied to the fan motor driving unit 40 by the latter drive stop signal, thereby causing the fan motor 42 and the fan to stop.

Then, the user checks the first temperature sensor 22 and repairs the opened power line of the first temperature sensor 22.

On the other hand, where it is determined that no drive stop command from the manipulation unit 60 has been received at the input port I1 of the control unit 10 (namely, if NO), the control procedure of the control unit 10 proceeds to a step S5. At this step S5, a determination is made about whether a first predetermined time of, for example, 2 minutes has elapsed from the point of time when the voltage of 5 V was applied to the input port I2 of the control unit 10. Where it is determined that the first predetermined time has elapsed (namely, if YES), the control procedure of the control unit 10 proceeds to a step S6 of decreasing respective internal temperatures of the refrigerating and freezing chambers because the internal temperatures may be increased to those at which foods contained in the refrigerating and freezing chambers may go bad.

At the step S6, the compressor driving unit 30 receives continuously the corresponding drive signal from the output port O2 of the control unit 10 for a second predetermined time of, for example, 3 minutes. Also, the fan motor driving unit 40 receives continuously the corresponding drive signal from the output port O3 of the control unit 10 for the second predetermined time. By the driving of the compressor driving unit 30 and the fan motor driving unit 40, air present in the refrigerating and freezing chambers comes into contact with an evaporator, thereby causing the internal temperatures of the refrigerating and freezing chambers to be decreased. After the elapse of the second predetermined time, both the compressor driving unit 30 and the fan motor driving unit 40 stop. For the compressor driving unit 30 and the fan motor driving unit 40, the above-mentioned operations are repeatedly carried out. As a result, the refrigerating and freezing chambers are maintained at desired temperatures allowing the foods contained in the refrigerating and freezing chambers to be kept fresh, respectively.

After execution of the step S6, the control procedure of the control unit 10 returns to the step S3 so as to determine whether the drive stop command has been received to the input port I1 of the control unit 10. Then, the operations following the step S3 are repeatedly carried out.

On the other hand, where it is determined at the step S1 that the first temperature sensor 22 is operating normally (namely, if NO), the normal temperature control as mentioned above is continued.

Where it is also determined at the step S5 that the first predetermined time has not elapsed from the point of time when the voltage of 5 V was applied to the input port I2 of the control unit 10 (namely, if NO), the determination about whether the first predetermined time has elapsed is continuously made.

On the other hand, when the first temperature sensor 22 is short-circuited at its power line during the normal temperature control as mentioned above, the voltage of 5 V from the first temperature sensor 22 is applied to the input port I2 of the control unit 10. Upon receiving the voltage of 5 V, the control unit 10 determines that the first temperature sensor 22 is operating abnormally. Accordingly, the control procedure of the control unit 10 proceeds to the step S2. Subsequently, steps following the step S2 are executed. At the step S4, the compressor 32 stops. Also, the fan motor 42 and the fan stop. Then, the user checks the first temperature sensor 22 and repairs the short-circuited power line of the first temperature sensor 22.

Where an abnormal state is detected at the second temperature sensor 24 at the step S1, the same procedures as those for the first temperature sensor 22 are repeatedly executed.

As apparent from the above description, the present invention provides a refrigerator wherein its compressor and fan motor are periodically driven at an abnormal state of its temperature detecting unit for detecting the temperature of its refrigerating space, thereby preventing foods contained in the refrigerating space from going bad, and a method for controlling the refrigerator.

In accordance with the present invention, the abnormal state of the temperature detecting unit is made known to the user via two paths, namely, a display and an audio alarming circuit. Accordingly, the user can become alerted to the abnormal state of the temperature detecting unit rapidly.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A refrigerator control system, comprising:

a compressor actuating unit for actuating a refrigerator compressor;

a fan actuating unit for actuating an internal air circulation fan of the refrigerator;

a temperature detecting unit for detecting an internal temperature of an internal chamber of the refrigerator and providing a temperature signal indicative of a detected temperature;

control means connected to said compressor actuating unit, said fan actuating unit, and said temperature detecting means for energizing said compressor and fan actuating units to supply cold air to said internal chamber in response to signals from said temperature detecting unit during a non-malfunctioning state of the latter, and for periodically energizing said compressor and fan actuating units during a malfunctioning state of said temperature detecting unit;

an indicating unit connected to said control unit for providing an external indication of a malfunctioning state of said temperature detecting unit; and a user-actuable manipulation member for enabling a user to supply an operation-off signal when a malfunctioning state of said temperature detecting unit is indicated by said indicating unit;

said control means being connected to said manipulation member for determining whether an operation-off signal is received from said manipulation means to prevent periodic energizing of said compressor and fan actuating units upon receipt of said operation-off signal.

2. The refrigerator control system according to claim 1, wherein said indicating unit provides a visual indication of said malfunction.

3. The refrigerator control system according to claim 2, wherein said indicating unit also provides an audio indication of said malfunction.

4. The refrigerator control system according to claim 1, wherein said indicating unit provides an audio indication of said malfunction.

5. The refrigerator control system according to claim 1, wherein said temperature detecting unit includes a thermistor having a variable resistance in accordance with the sensed temperature.

6. A method for controlling a refrigerator, comprising the steps of:

A) detecting a temperature of an internal chamber of the refrigerator by a temperature detecting unit;

B) operating a compressor and internal air circulation fan of the refrigerator to supply cold air to said internal chamber in response to the detected temperatures during a non-malfunctioning state of said temperature detecting unit;

C) detecting a malfunctioning state of said temperature detecting unit;

D) providing an external indication of said malfunctioning state in response to the malfunctioning state being detected; and E) determining whether an operation-off signal has been provided from a user-actuable manipulation member, and periodically driving said compressor and internal air circulating fan of the refrigerator in response to detection of said malfunctioning state and in response to a determination that no operation-off signal has been provided from said manipulation member.

7. The method according to claim 6, wherein step (D) comprises providing an audio indication of said malfunctioning state.

8. The method according to claim 7, wherein step (D) also comprises providing a visual indication of said malfunctioning state.

9. The method according to claim 6, wherein step (D) comprises providing a visual indication of said malfunctioning state.

10. The method according to claim 6, wherein step (E) comprises periodically driving said compressor and fan for predetermined time intervals.

* * * * *